Figure 1:
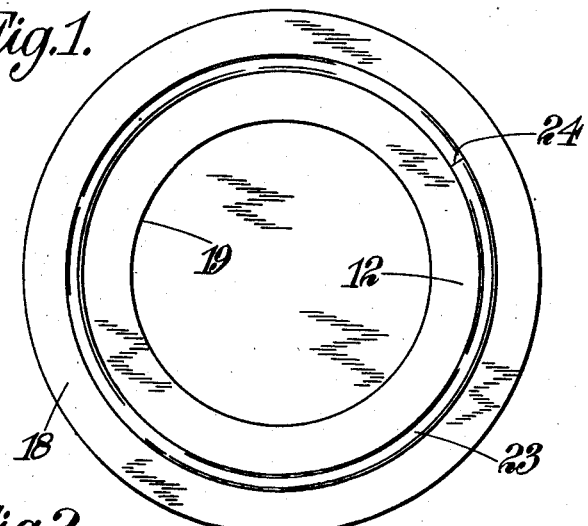

July 7, 1959

P. WILLS 2,893,060

JOINT RINGS

Filed Jan. 12, 1956

Inventor
Percy Wills
By *[signature]*
his attorneys

United States Patent Office 2,893,060
Patented July 7, 1959

2,893,060
JOINT RINGS

Percy Wills, Bridgwater, England, assignor to Wills Pressure Filled Joint Ring Limited, Bridgwater, England, a British company Application January 12, 1956, Serial No. 561,384

Claims priority, application Great Britain
January 12, 1955

3 Claims. (Cl. 18—55)

This invention comprises improvements in or relating to joint-rings.

It is known to manufacture joint-rings which are hollow and contain gas under pressure so that they are resilient although they may be made of a relatively hard material such as copper or stainless steel tube. Hitherto such rings have been made by bending metallic tube into the shape desired, including within the tube a substance which decomposes under heat to yield permanent gases, butt welding the ends of the tube together to form a complete ring and then heating the rings in an oven to decompose the materials within the tube and produce gas under pressure therein. Such rings are for example described in our British Patent No. 696,684.

We have now found that satisfactory pressure-filled joint-rings can be produced from certain non-metallic resilient materials of the kind which are commonly referred to as plastics because they are capable of being moulded to shape. As such materials are non-conductors of electricity and are plastic at the decomposition temperatures of the gas producing materials commonly employed, it is not possible to follow in their manufacture the process above referred to of electrically welding the ends of the tubes together and subsequently heating them in an oven.

According to the present invention a process of producing pressure-filled joint-rings from plastic materials comprises the steps of taking an embryo ring of the plastic material which is open so that gas producing substances can be introduced into it, introducing such gas producing substances, placing the assembly of ring and substances in a mould so formed as to hold the open joint of the ring together, heating the mould until the joint fuses together and further heating to decompose the contents of the ring and produce gas under pressure therein. It is necessary to employ as the plastic material one of the plastics which is capable of uniting under heat, or at all events of employing at the joint some material which will unite the joint together under heat. A satisfactory material for the production of such rings consists of poly-tetra-fluoroethylene. The ring may be jointed in any desired way; for example, it might be initially made in two parts which have a circumferential joint and are pressed together in a mould, but a preferred method is to make it from tubing of the plastic material which is bent to the desired shape and the ends of which are held together in the mould.

The invention includes pressure-filled joint-rings made of plastic material, for example poly-tetrafluoroethylene, and having a section across the hollow of the ring which is either circular or non-circular as desired.

Figure 2:
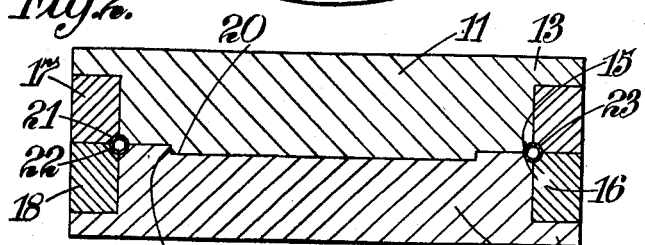
Figure 3:
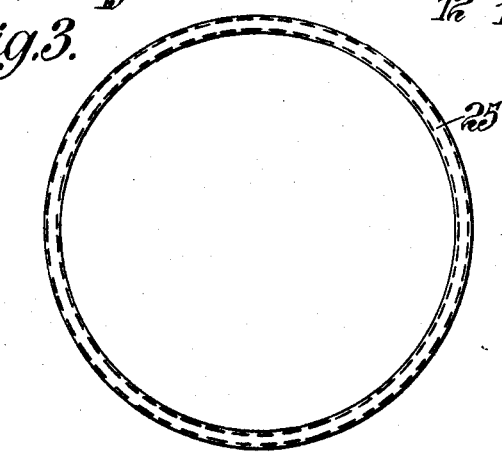

The following is a description by way of example of one specific form of the process according to the invention and rings are manufactured therein:

In the accompanying drawing,
Figure 1 is a plan of a part of a mould,
Figure 2 is a vertical central section through a complete mould of the kind shown in Figure 1,
Figure 3 is a plan of a complete joint-ring.

In the following description it is assumed that it is desired to produce rings which have a circular contour, and the cross section of the rim of which is also circular, although it will be understood that any other shape whether of the contour or of the cross section can be produced as desired.

A mould is formed by taking two discs of metal, 11, 12, the external diameter of which is greater than the mean diameter of the ring desired. These discs are turned down over a portion of their thickness to a diameter equal to the mean diameter of the joint-ring desired, leaving projecting flanges 13, 14 around the discs at the back thereof. The external corners 15, 16 of the turned down portions are hollowed out to the shape of a quadrant of the same radius as the exterior of the cross section of the ring to be produced. When the two discs are fitted together the quadrantal hollows in their corners will form a half-circle, and means (not shown) are provided to clamp them together in this position. In order to keep the discs 11, 12 concentric with each other a recess 19 is formed in the lower ring 12 and a corresponding spigot portion 20 is provided in the upper ring 11, the spigot and the recess fitting together.

Two rectangular section steel rings 17, 18 are taken of an internal diameter such as to fit slidably upon the turned down portions of the discs 11, 12 with their backs against the flanges 13, 14 thereof and their faces in line with the faces of the discs. Each of these rings has its internal corner turned out to a quadrantal shape as at 21, 22 so that if the rings are fitted between the flanges of the discs they will complete the outer half-circle of the cross section of the ring. This assembly forms the mould.

The discs being unbolted from each other, a tube 23 is taken of poly-tetra-fluoroethylene which has been bent to a circular shape and is of such length and diameter as to fit into the mould with its ends butting close to one another as shown at 24. Into the plastic tube 23 there is inserted a suitable quantity of sodium azide, such that when decomposed it will produce within the ring an internal pressure of about 350 lbs. per sq. inch. The plastic ring having been inserted in the mould as shown in Figure 2 the parts are clamped together and placed in an oven which is maintained at a temperature of from 360° C. to 400° C. As the mould heats up the first action is that the plastic material is softened and becomes tacky and the ends of the tube will weld themselves together. As the temperature rises further the sodium azide is decomposed and nitrogen under pressure is set free within the ring. After the mould has reached the temperature of the oven it is removed therefrom and allowed to cool, and when disassembled the plastic joint-ring 25 will be complete, as shown in Figure 3 except possibly for the removal of any "flash" which may have formed at the joints between the parts of the mould.

I claim:

1. A process of producing gas pressure-filled joint rings comprising in combination the steps of taking an embryo ring of a plastic material having a welding temperature well below its decomposition point, introducing a solid gas evolving substance thereinto which will evolve a permanent gas when heated to a temperature lying between the welding and decomposition temperature of the ring, placing the ring in a mold so formed that the ring is held in its desired shape, heating first to the welding temperature of the ring and so effecting a weld thereafter raising the temperature to the gas evolution temperature of the introduced solid, and allowing to cool while still held in the mold.

2. A process of producing gas pressure-filled joint rings comprising in combination the steps of taking an embryo ring of polytetrafluoroethylene, introducing a solid gas evolving substance thereinto which will evolve a permanent gas when heated to a temperature lying between the welding and decomposition temperatures of polytetrafluoroethylene, placing the ring in a mold formed to hold it in the desired shape, heating first to the welding temperature of the ring, thereafter raising the temperature above the gas evolution temperature of the introduced solid and allowing to cool while still in the mold.

3. A process of producing gas pressure-filled joint ring comprising in combination the steps of taking an embryo ring of polytetrafluoroethylene, introducing sodium azide thereinto, placing the ring in a mold formed to hold it in the desired shape, heating first to the welding temperature of the ring, thereafter raising the temperature to between 360° C. and 400° C. and allowing to cool while still in the mold.

References Cited in the file of this patent

UNITED STATES PATENTS

| | | |
|---|---|---|
| 1,966,202 | Pfefferle | July 10, 1934 |
| 2,688,436 | Melaven | Sept. 7, 1954 |
| 2,717,025 | Jelenek | Sept. 6, 1955 |
| 2,737,405 | Shinn | Mar. 6, 1956 |

OTHER REFERENCES

| | | |
|---|---|---|
| 576,206 | Great Britain | Mar. 22, 1946 |
| 696,684 | Great Britain | Sept. 9, 1953 |